US012604867B2

(12) United States Patent
Wong

(10) Patent No.: US 12,604,867 B2
(45) Date of Patent: Apr. 21, 2026

(54) PET NECK COLLAR

(71) Applicant: Pak Hei Wong, Dongguan City (CN)

(72) Inventor: Pak Hei Wong, Dongguan City (CN)

( * ) Notice: Subject to any disclaimer, the term of this patent is extended or adjusted under 35 U.S.C. 154(b) by 0 days.

(21) Appl. No.: 18/800,740

(22) Filed: Aug. 12, 2024

(65) Prior Publication Data

US 2025/0000057 A1    Jan. 2, 2025

Related U.S. Application Data

(63) Continuation-in-part of application No. 18/224,767, filed on Jul. 21, 2023.

(51) Int. Cl.
 *A01K 13/00* (2006.01)
 *A01K 27/00* (2006.01)

(52) U.S. Cl.
 CPC .......... *A01K 13/006* (2013.01); *A01K 27/001* (2013.01)

(58) Field of Classification Search
 CPC ............................ A01K 13/006; A01K 27/001
 See application file for complete search history.

(56) References Cited

U.S. PATENT DOCUMENTS

| | | | | |
|---|---|---|---|---|
| 537,542 A | * | 4/1895 | Moore ...................... | A45D 8/34 |
| | | | | 132/275 |
| 2,795,232 A | * | 6/1957 | Klein ........................ | A45D 8/34 |
| | | | | 132/275 |
| D294,194 S | * | 2/1988 | Herrick ........................... | D2/500 |

| | | | | |
|---|---|---|---|---|
| 5,156,171 A | * | 10/1992 | Goodman ................. | A45D 8/34 |
| | | | | 132/273 |
| 5,301,696 A | * | 4/1994 | Revson ..................... | A45D 8/34 |
| | | | | 132/273 |
| 5,456,270 A | * | 10/1995 | Wong ..................... | A45D 8/001 |
| | | | | 132/275 |
| D475,162 S | * | 5/2003 | Huber .......................... | D30/152 |
| 6,601,590 B2 | * | 8/2003 | Neary ...................... | A45D 8/34 |
| | | | | 132/273 |
| 7,004,179 B1 | * | 2/2006 | Lunde ...................... | A45D 8/12 |
| | | | | 132/273 |
| 8,851,086 B2 | * | 10/2014 | Stachowski .............. | A45D 8/36 |
| | | | | 132/273 |
| 2007/0199521 A1 | * | 8/2007 | Winestock ............... | A61D 9/00 |
| | | | | 119/855 |
| 2019/0133287 A1 | * | 5/2019 | Adams ..................... | A45D 8/02 |

FOREIGN PATENT DOCUMENTS

| | | | | | |
|---|---|---|---|---|---|
| CN | 102630598 A | * | 8/2012 | ............... | A61D 9/00 |
| KR | 20210000683 U | * | 3/2021 | ........... | A01K 13/006 |
| KR | 20240037780 A | * | 3/2024 | ........... | A01K 13/006 |

* cited by examiner

*Primary Examiner* — Ebony E Evans
(74) *Attorney, Agent, or Firm* — Birchwood IP

(57) ABSTRACT

This invention discloses a pet collar in the field of pet supplies, including an inner ring and a barrier configured on the inner ring, wherein the diameter of the inner ring is adjustable. The barrier is composed of multiple structural units distributed on the inner circumference. The upper part of the structural unit converges inwardly to form a closed top. At least in the lower part, the adjacent structural units form drainage positions, and at least in the upper part, the adjacent structural units form ventilation gaps. This collar uses a multi-petal design which can significantly improve the breathability of the collar, reduce moisture accumulation and prevent skin diseases, increase wearing comfort and reduce the impact of the collar on pets and their walking.

20 Claims, 21 Drawing Sheets c a

4

PET NECK COLLAR

FIELD OF INVENTION

This invention relates to the field of pet supplies, in particular to a pet neck collar.

BACKGROUND OF THE INVENTION

Pet neck collars are protective devices designed specifically for pets and are primarily used to prevent pets from licking or scratching wounds, surgical sites, or other sensitive areas on their bodies, thereby accelerating wound healing and preventing infection. Currently, the pet neck collars sold in the market mainly have two common shapes: classic circular and conical or cone-shaped.

The classic circular neck collar is the most common shape, similar to a collar, that surrounds the pet's neck and is secured in place. Conical or cone-shaped collars are wider and gradually taper downward and are designed to prevent pets from licking or scratching injured or post-surgical areas. As shown in FIG. 1, the conventional cone-shaped collar design is intended to prevent pets from reaching wounds on their bodies.

Although existing pet neck collars can prevent pets from licking wounds to some extent, they have many design and material flaws that affect the comfort and health of pets. Hard plastic collars, due to their non-breathable nature, easily lead to moisture accumulation in the pet's neck area after wearing, especially in hot weather or after pet activity. This moisture is not easily dissipated and can breed bacteria, leading to skin disease. As shown in FIG. 2, the schematic diagram of a pet dog wearing a conventional cone-shaped collar a shows that due to the hard material and sharp edges, it could rub the pet's skin after long-term wearing, causing discomfort and possible skin damage. The weight of the hard material also makes the collar feel cumbersome and interferes with the pet's natural movements.

The conventional cone-shaped collars a also have problems after pets eat and drink, i.e., water and food residues easily accumulate on the inner wall b area of the collar, which are difficult to evaporate, leading to bacterial growth and skin diseases. Moreover, pets usually shake their heads after drinking water, and the cone-shaped collar forms a closed loop, causing water and saliva to spread around the inner wall of the collar, which is unable to dry and results in fluid and dirt accumulation, further increasing the risk of bacterial growth.

Neck collars made of fabric combined with polyester fiber filling, although slightly better in breathability than plastic, the inner layer of polyester fiber filling material easily absorbs and retains the moisture, which may also lead to moisture accumulation in the neck area after long-term wearing, increasing the risk of skin diseases. In addition, due to the softness of the polyester fiber filling material, the support of the collar is insufficient and easily deformed, which cannot effectively prevent pets from licking wounds. Although this type of collar is relatively soft, it may still cause local pressure and discomfort after long-term wearing, especially when pets are sleeping, the collar cannot provide sufficient support and comfort.

To more intuitively demonstrate the flaws of existing collars, a schematic diagram of a pet dog wearing a conventional cone-shaped collar a that interferes with walking is shown in FIG. 3. It can be seen that the conventional cone-shaped collar a easily interferes with a wall c during walking, making it very uncomfortable for pets to walk and easily collide with surrounding objects, increasing the pet's stress and discomfort. Due to the design features and material limitations of the cone-shaped collar a, the pets are unable to freely perform daily activities while wearing it, including walking, eating, and drinking, further exacerbating their discomfort.

Given the flaws of the existing pet collars in terms of breathability, comfort, flexibility, and durability, the development of a new multi-petal pet collar is particularly necessary.

SUMMARY OF THE INVENTION

The purpose of this invention is to overcome at least one flaw in the existing technology and provide a pet neck collar. This collar employs a multi-petal design that can significantly improve the breathability of the collar, reduce moisture accumulation, prevent skin diseases, increase wearing comfort, and reduce the impact of the collar on pets and their walking.

To achieve the above purpose, this invention discloses a pet neck collar including an inner ring and a barrier configured on the inner ring, wherein the barrier is composed of multiple structural units distributed on the inner circumference; at least in the lower part, the adjacent structural units cooperate to form a drainage position, and at least in the upper part, the adjacent structural units cooperate to form a ventilation gap.

In some embodiments, the diameter of the inner ring is adjustable.

In some embodiments, the upper part of the structural unit converges inwardly to form a closed top.

In some embodiments, the overall shape of the structural unit is similar to an ellipse, with a wider bottom and gradually converging upward to form a tip.

In some embodiments, the structural unit is composed of a core board and an outer cover encasing the core board.

Furthermore, the core board can be made of a foam plastic board, a hollow plastic board, or a sponge.

Furthermore, the core board is provided with several ventilation holes.

Furthermore, the outer cover can be made of a breathable fabric, a waterproof fabric, or an absorbent fabric.

Furthermore, the outer cover has a water-repellent layer.

In some embodiments, at least the lower parts of adjacent structural units are spaced apart to form hollow drainage positions.

In some embodiments, at least the lower parts of adjacent structural units are closely fitted to form solid drainage positions.

In some embodiments, all structural units are tilted in the same direction such that at least the lower parts of adjacent structural units partially overlap above and below, using the overlap gap to form the solid or hollow drainage positions.

In some embodiments, the inner ring has at least two layers of barriers configured in a front and rear order, the two barriers being rotated and misaligned such that the rear barrier partially covers the ventilation gaps of the adjacent front barrier.

Furthermore, the outer diameter of the rear barrier is larger than that of the adjacent front barrier.

Furthermore, the structural units in the rear barrier are positioned between two corresponding structural units in the adjacent front barrier.

Furthermore, the structural units in the rear barrier have at least one connection point with each of the two corresponding structural units in the adjacent front barrier.

Furthermore, the rear barrier is spaced apart from the adjacent front barrier.

In some embodiments, the inner ring is a deformable flexible body and the diameter of the inner ring is adjusted by a drawstring, the inner ring has a string guide channel and a string exit hole, the drawstring passes through the string guide channel and exits from the string exit hole, forming an adjustable closed loop.

In some embodiments, the inner ring is a deformable flexible body and at least one region of the inner ring is disconnected and overlapped, wherein the inner ring diameter is adjusted by adjusting the overlap size of the disconnected region.

In some embodiments, the inner ring is an elastic inner ring, the inner ring can elastically deform to adjust the inner ring diameter to adapt to different pet wearing needs.

In some embodiments, the structural units of the barrier are detachably connected to the inner ring.

Compared to the existing technology, this invention has at least one of the following beneficial effects:

1. The upper parts of the structural units form the ventilation gaps, ensuring air circulation inside the collar, effectively preventing the stuffy feeling caused by long-term wearing, while reducing the collar's obstruction of the pet's vision, improving the pet's wearing comfort.

Drainage position design:

2. The lower parts of the adjacent structural units form the drainage positions that allow saliva and other fluids to drain quickly, preventing accumulation inside the collar, avoiding odors and bacterial growth, and keeping the inside of the collar clean and dry. Multi-petal structure:

3. Multiple structural units form the multi-petal structure. When one or more structural units collide a wall or object, the structural units can quickly deform, reducing walking interference.

The beneficial effects listed above do not exhaust all advantages. Other potential beneficial effects and detailed technical implementation methods will be further disclosed in the embodiments or other descriptions of this invention.

BRIEF DESCRIPTION OF THE DRAWINGS

Various aspects of this disclosure will be better understood after reviewing the specific embodiments described below in conjunction with the accompanying drawings. It should be noted that the positions, dimensions, and ranges of the various structures shown in the drawings are not always indicative of their actual positions, dimensions, and ranges. In the accompanying drawings.

DETAILED DESCRIPTION OF THE PREFERRED EMBODIMENTS

Figure 1:
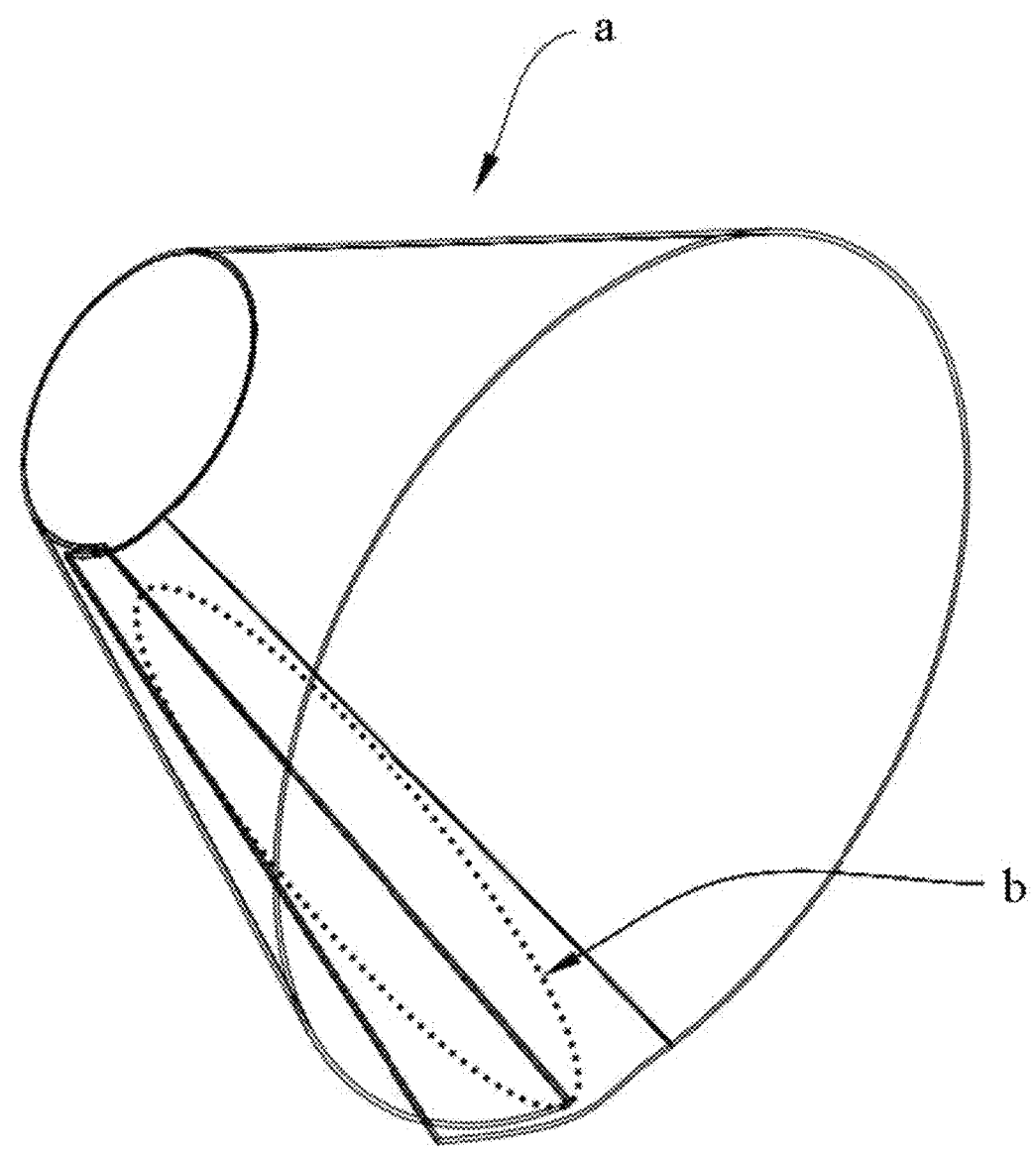
FIG. 1 is a structural schematic diagram of a conventional collar.
Figure 2:
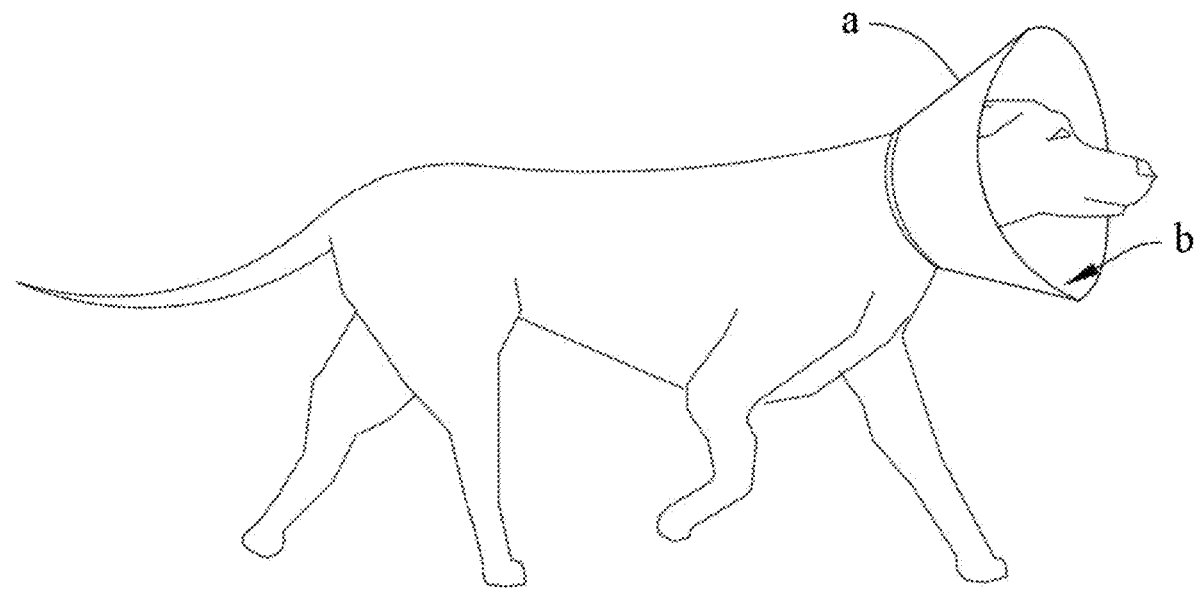
FIG. 2 is a schematic diagram of the state of use of a pet dog wearing the conventional collar.
Figure 3:
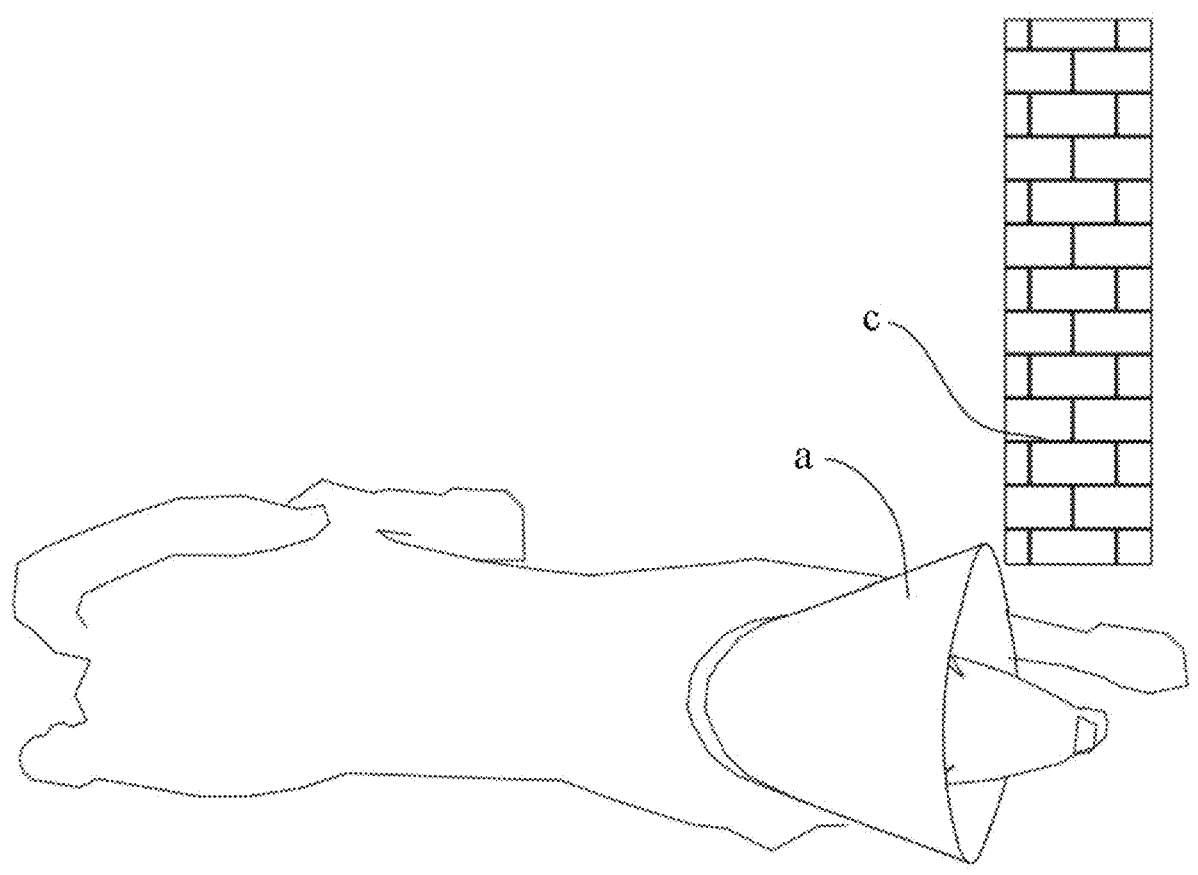
FIG. 3 is a schematic diagram of the state when a pet dog wearing the conventional collar is obstructed by a wall while walking.
Figure 4:
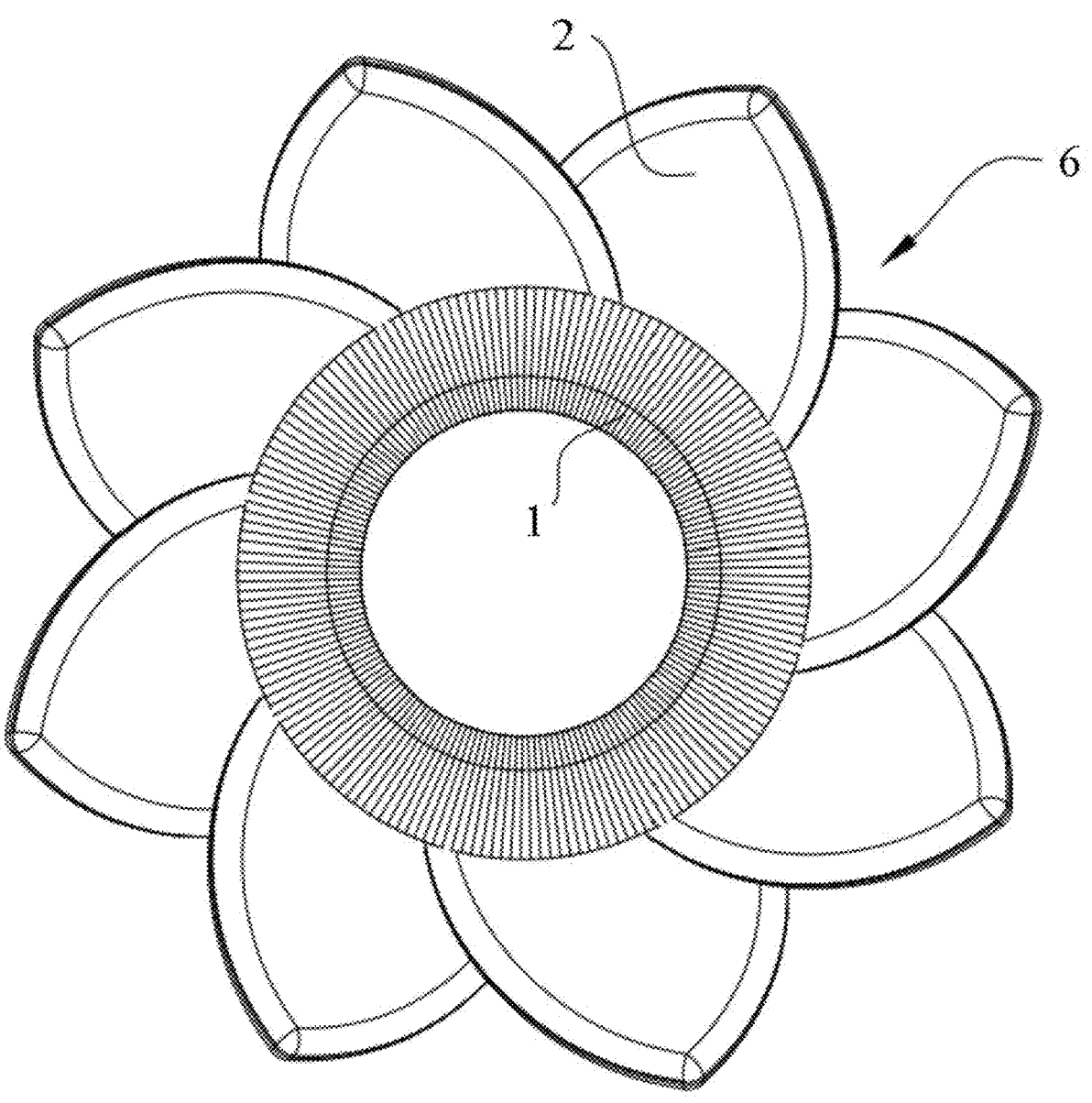
FIG. 4 is a structural schematic diagram of Embodiment 1.
Figure 5:
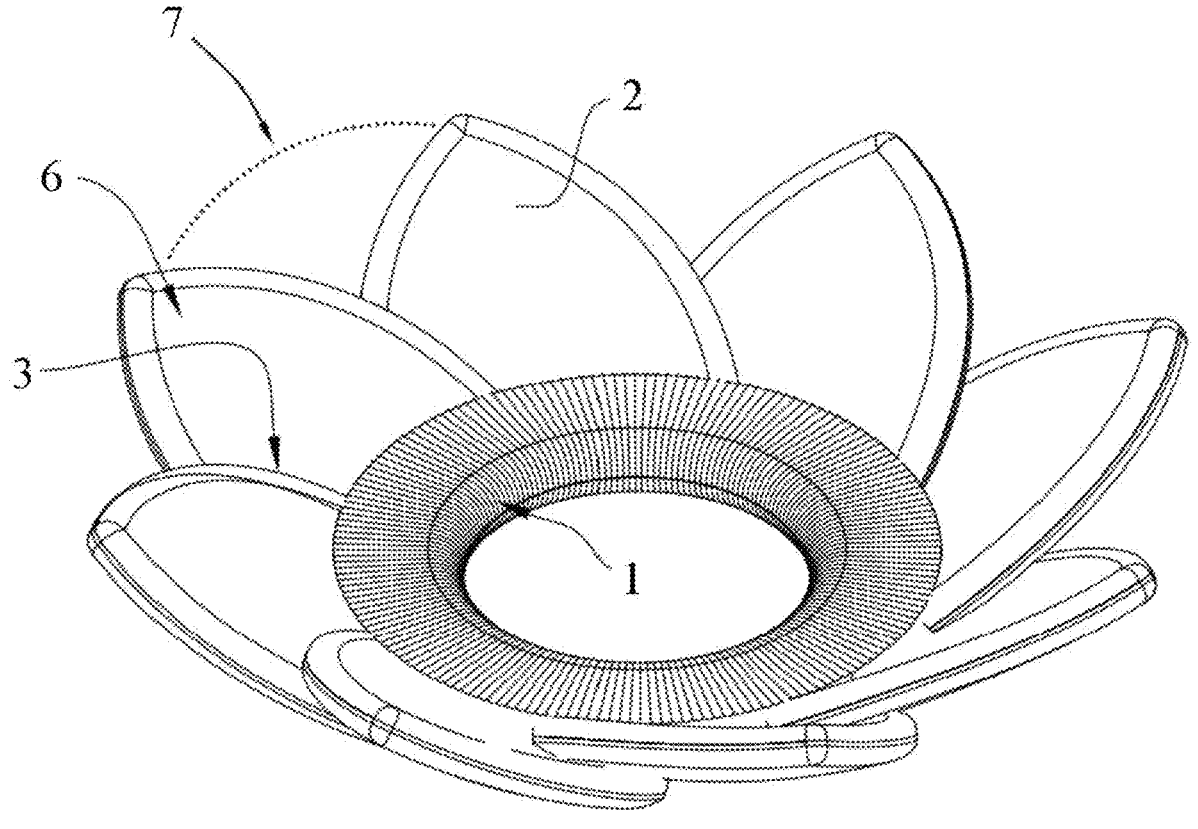
FIG. 5 is a structural schematic diagram of Embodiment 1 from another perspective.
Figure 6:
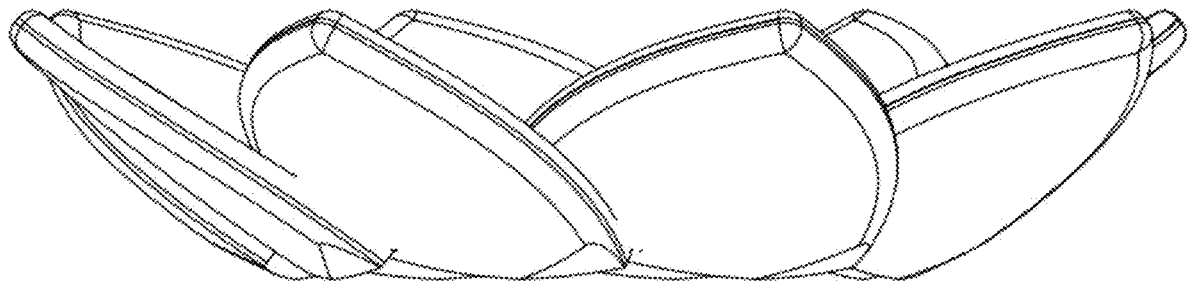
FIG. 6 is a structural schematic diagram of Embodiment 1 from yet another perspective.

The following will describe this disclosure with reference to the drawings, which illustrate various embodiments of this disclosure. However, it should be understood that this disclosure can be presented in many different forms and should not be construed as limited to the embodiments described herein; rather, these embodiments are provided to make this disclosure more complete and to fully convey the scope of protection to those skilled in the art. It should also be understood that the embodiments disclosed herein may be combined in various ways to provide additional embodiments.

It should be understood that throughout the drawings, the same reference numbers indicate the same elements. In the drawings, the dimensions of some features may be distorted for clarity.

It should be understood that the terms used in the specification are used only to describe specific embodiments and are not intended to limit this disclosure. All terms (including technical and scientific terms) used in the specification have the meanings commonly understood by those skilled in the art, unless otherwise defined. For the sake of brevity and/or clarity, techniques, methods, and devices known to those skilled in the relevant art may not be discussed in detail, but in appropriate cases such techniques, methods, and devices should be considered part of the granted specification.

The singular forms "a," "the," and "said" used in the specification include plural forms unless clearly indicated otherwise. The terms "include," "contain," and "have" as used in the specification indicate the presence of the claimed features, but do not exclude the presence of one or more other features. The term "and/or" as used in the specification includes any and all combinations of one or more of the related listed elements.

Embodiment 1

As shown in FIGS. 4-7, this embodiment discloses an exemplary structure of a pet neck collar with a single barrier and structural units stacked obliquely.

In this embodiment, the inner ring 1 employs an adjustable diameter design in which the inner ring diameter is adjusted by elastic deformation of the material. This design allows the pet neck collar to adapt to different sizes of pet necks, providing flexibility and comfort.

Specifically, the inner ring 1 is an elastic inner ring, made of materials with high elasticity and durability, such as silicone, chloroprene rubber, or thermoplastic elastomer (TPE). These materials not only have excellent extensibility and softness but can also maintain their shape and strength during long-term use, thus ensuring the durability and stability of the inner ring.

The core design of the elastic inner ring 1 is its conformability. When the inner ring 1 is not worn, the ring maintains a preset initial inner diameter, which is typically slightly smaller than the actual neck circumference of the pet. When the collar is placed on the pet, the pet's neck will slightly stretch the inner ring 1, causing the ring's diameter to increase slightly to accommodate the pet's neck circumference. This design, based on the elastic deformation of materials, ensures that the collar can be worn stably on the pet's neck without causing problems of looseness or tightness due to improper sizing.

In a practical operation, the user only needs to easily slip the elastic inner ring 1 over the pet's neck. Since the initial inner diameter of the inner ring 1 is slightly smaller than the actual neck circumference of the pet, when worn, the inner ring 1 will naturally expand due to the slight pulling force produced by the pet's neck until it adapts to the size of the pet's neck. This adaptive design requires no additional manual adjustment by the user, which greatly facilitates use.

It should be understood that the choice of material for the elastic inner ring 1 is a key to the design. The highly-elastic material used can not only quickly recover the shape of the ring in a short time, but also maintain the elasticity and stability during long-term wearing. For example, silicone material is widely used in various pet products due to its softness, non-toxicity, and durability. Chloroprene rubber is widely used due to its excellent wear resistance and aging resistance. Thermoplastic elastomers (TPE) have become the preferred material for many high-end pet products due to their excellent elasticity and comfort.

It can be understood that the design of the inner ring 1 takes into account not only the choice of elastic materials, but also pays particular attention to wearing comfort and safety. The softness of the elastic material ensures that the ring does not cause irritation or compression of the skin when worn by the animal. At the same time, the elastic material's elasticity allows the inner ring 1 to fit snugly around the pet's neck, preventing the inner ring 1 from slipping or rotating due to looseness.

For example, when a pet cat wears this collar, the initial inner diameter of the inner ring 1 is slightly smaller than the actual neck circumference of the cat. During wearing, the cat's neck will slightly stretch the inner ring, thereby increasing the diameter of the ring to fit the cat's neck circumference. The elastic material of the inner ring 1 can respond quickly to this process, expanding to an appropriate size and fitting snugly around the cat's neck. Even if the cat is very active, the collar can remain stable and not easily fall off or move. The elastic inner ring 1 is not only suitable for daily use, but also very well suited for use in special occasions, such as during the pet's post-operative recovery period. The elastic inner ring 1 can provide stable support and protection, preventing discomfort or injury caused by improper wearing. Moreover, this design is also suitable for various environmental and weather conditions, as the elastic material can withstand various temperature and humidity changes while maintaining its excellent performance and durability.

Figure 20:
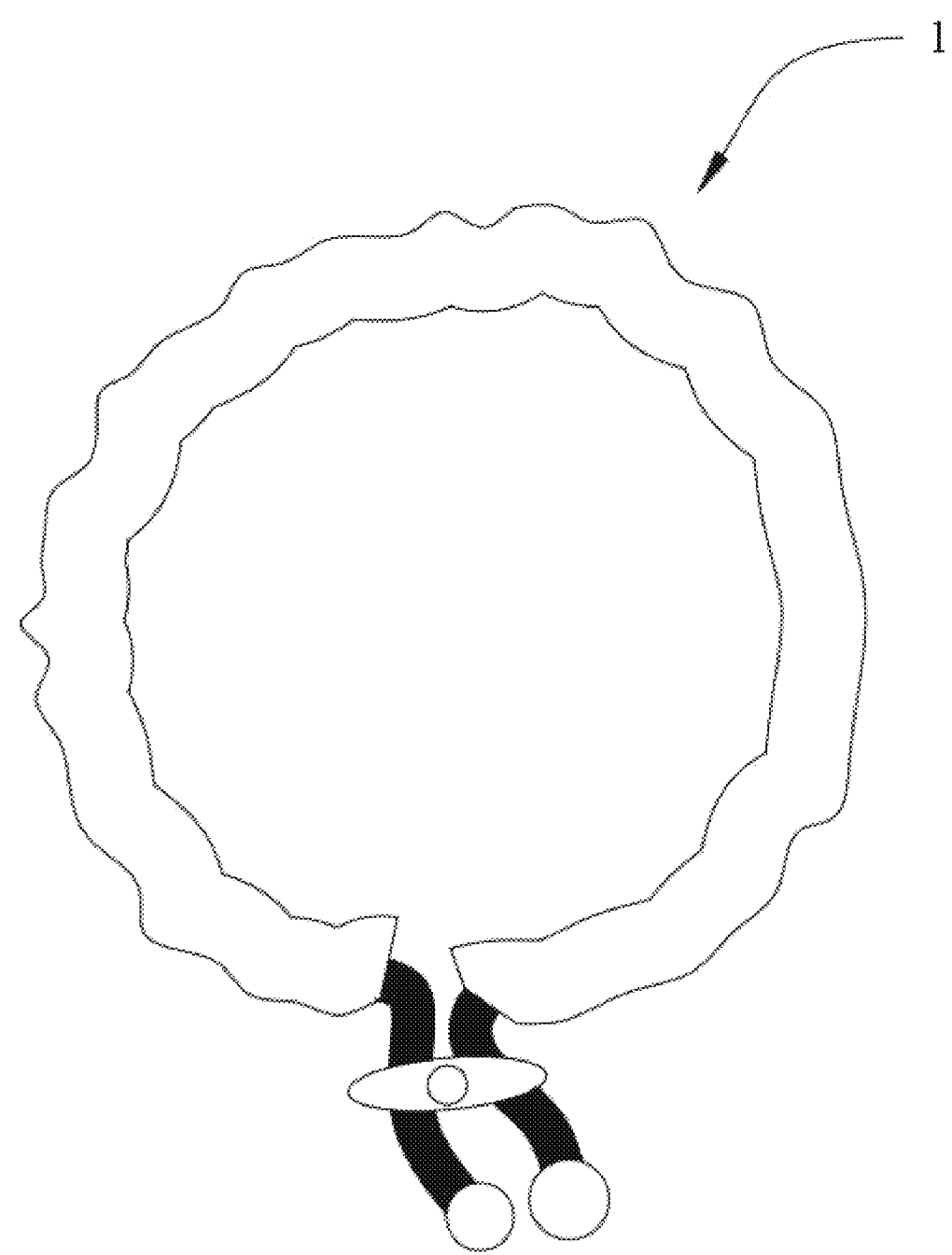
FIG. 20 is a structural schematic diagram of an inner ring.
Figure 21:
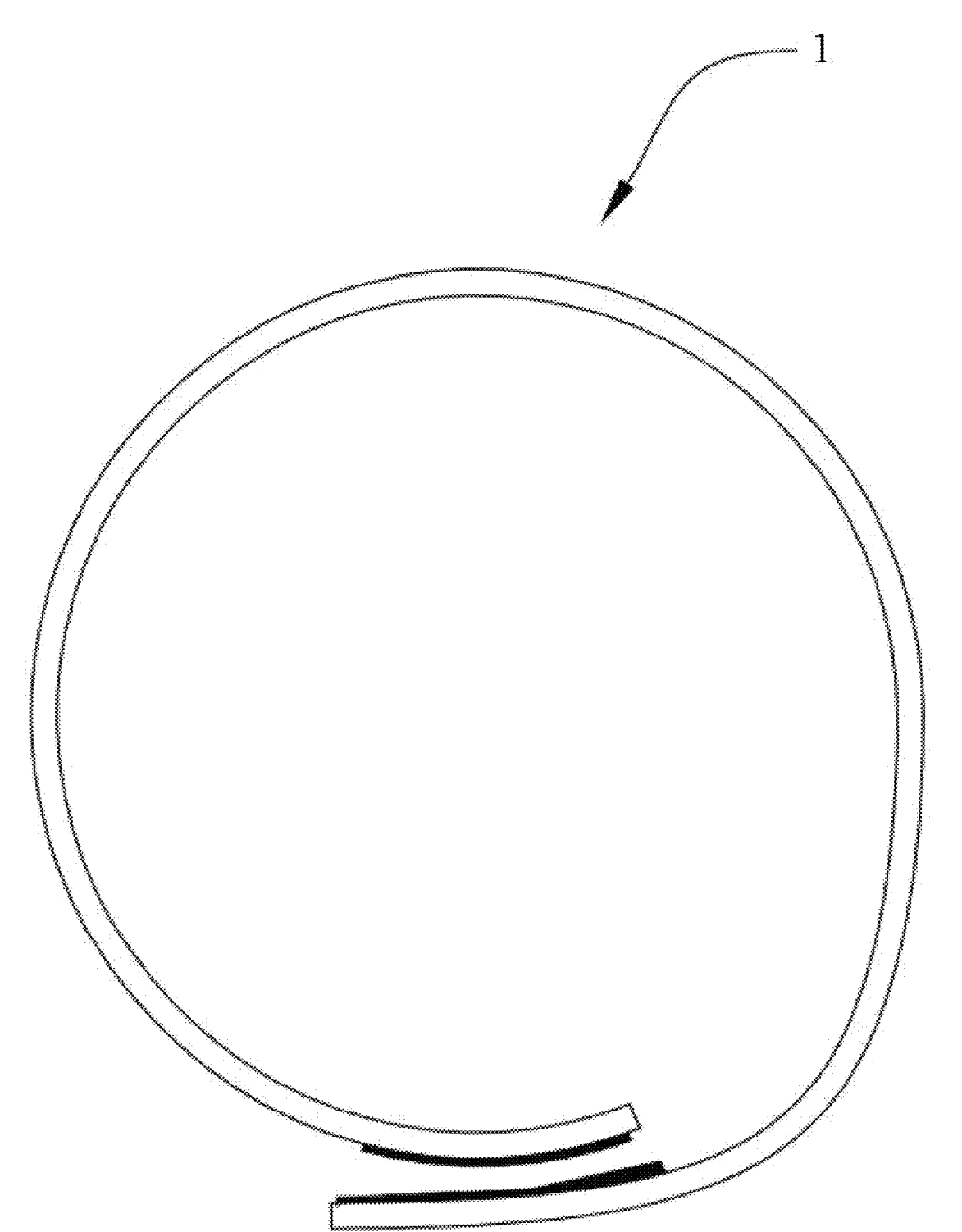
FIG. 21 is a structural schematic diagram of another type of inner ring.

It should be understood that the structure of the inner ring 1 can also be in the form of a drawstring or a roll-back fastening, as shown in FIGS. 20 and 21.

More specifically, as shown in FIG. 20, when the drawstring form is used, the inner ring 1 is made of a flexible fabric with elasticity to ensure that it does not cause discomfort to the pet during adjustment. The inner ring 1 has a string guide channel and a string exit hole inside, wherein the drawstring passes through the string guide channel and exits from the string exit hole, forming an adjustable closed loop. The drawstring material is usually a high-strength nylon or polyester fiber with a good wear resistance and tensile strength, ensuring smooth adjustment and durability.

As shown in FIG. 21, the inner ring 1 in this structure is a deformable flexible body, usually made of materials with high flexibility and durability, such as nylon, chloroprene rubber, or other synthetic fiber materials. These materials are not only light and soft, but can also maintain their shape and strength under repeated bending and stretching, providing good wearing comfort and durability. Because the design of the inner ring takes into account the different neck diameters of different pets, it must have some adjustability to adapt to different size requirements.

Continuing with FIG. 21, at least one region in the inner ring structure 1 is designed to be in a disconnected state to form an adjustable interface. This disconnected region allows the diameter to be adjusted by overlapping. When the diameter of the inner ring 1 is to be adjusted, the user can overlap the two ends of the disconnected region and change the overall diameter of the inner ring 1 by adjusting the length of the overlapped portion. Specifically, when the length of the overlapped portion increases, the diameter of the inner ring 1 decreases; when the length of the overlapped portion decreases, the diameter of the inner ring 1 increases.

To ensure that the overlapped portion can be held firmly in the desired position after adjustment, a fixing device is usually provided in the overlap region. For example, Velcro, buckle straps, zippers, or other fastening mechanisms may be used to secure the overlapped portion. Velcro is a common choice because it is easy to use, flexible to adjust, and can quickly achieve inner ring 1 diameter adjustment. Users simply need to attach the Velcro pieces of the overlap region together, adjust to the appropriate length, and press to secure. The buckle straps and the zippers can also provide similar fixing effects and offer greater stability and durability.

It can be understood that during the adjustment process, the flexible material of the inner ring can adapt to different changes in neck diameter, ensuring that the collar still fits snugly around the pet's neck after adjustment, without creating too much of a gap or feeling of pressure. This design not only improves the adaptability and comfort of the collar, but also enhances wearer safety by preventing the collar from accidentally falling off during the pet's activities.

For example, when this collar is placed on a pet dog, if the diameter of the inner ring 1 is found to be too large, the two ends of the disconnected region can be overlapped more and secured in the new position with the Velcro or buckle straps. This will reduce the diameter of the inner ring and allow the collar to fit more snugly around the pet's neck. Conversely, if the diameter of the inner ring 1 is too small, the length of the overlapped portion can be reduced to increase the diameter of the inner ring until the ring reaches the appropriate size.

This design of adjusting the diameter of the inner ring 1 by overlapping is not only easy to operate, but also has strong flexibility, which is suitable for pets of various sizes. This design is also convenient for quick adjustment in various scenarios, providing great convenience. Whether in the pet's daily activities or in special occasions (such as post-operative recovery), this adjustable inner ring 1 design can provide the best adaptability and comfort.

In this embodiment, the barrier 6 is composed of multiple distributed structural units 2, with the structural units 2 distributed along the inner ring and the upper part of each structural unit 2 converges inwardly to form a closed top. The overall shape of the structural unit 2 is similar to an ellipse.

Figure 7:
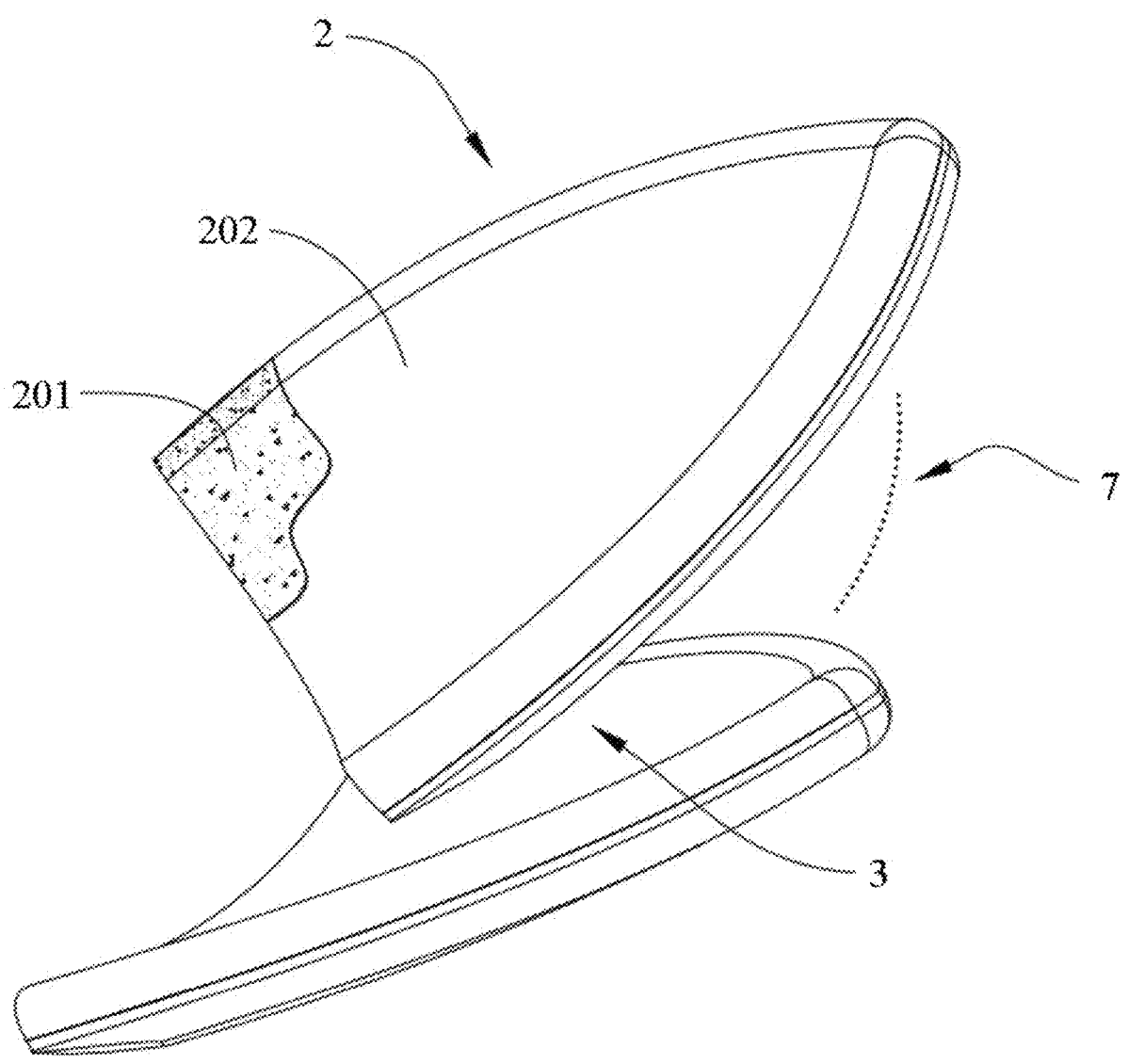
FIG. 7 is a structural schematic diagram of the fitting of two adjacent structural units in Embodiment 1, where the outer cover of one structural unit is partially cut.

As shown in FIG. 7, the structural unit 2 consists of a core board 201 and an outer cover 202 covering the core board 201. The core board 201 is made of a foam plastic board that is lightweight and has a buffering effect, which effectively disperses pressure and reduces the burden on the pet's neck. The foam plastic board is lightweight, which can reduce the load when the pet is wearing it. In the above structure, the outer cover 202 covering the core board 201 uses highly breathable fabric, such as mesh fabric or waterproof fabric that has been specially treated. This fabric allows air to circulate, prevents stuffiness, and has waterproof functions to prevent liquid from entering. The breathable fabric not only helps to maintain dryness inside the collar, but also quickly evaporates accumulated moisture, thereby enhancing overall comfort.

Figure 18:
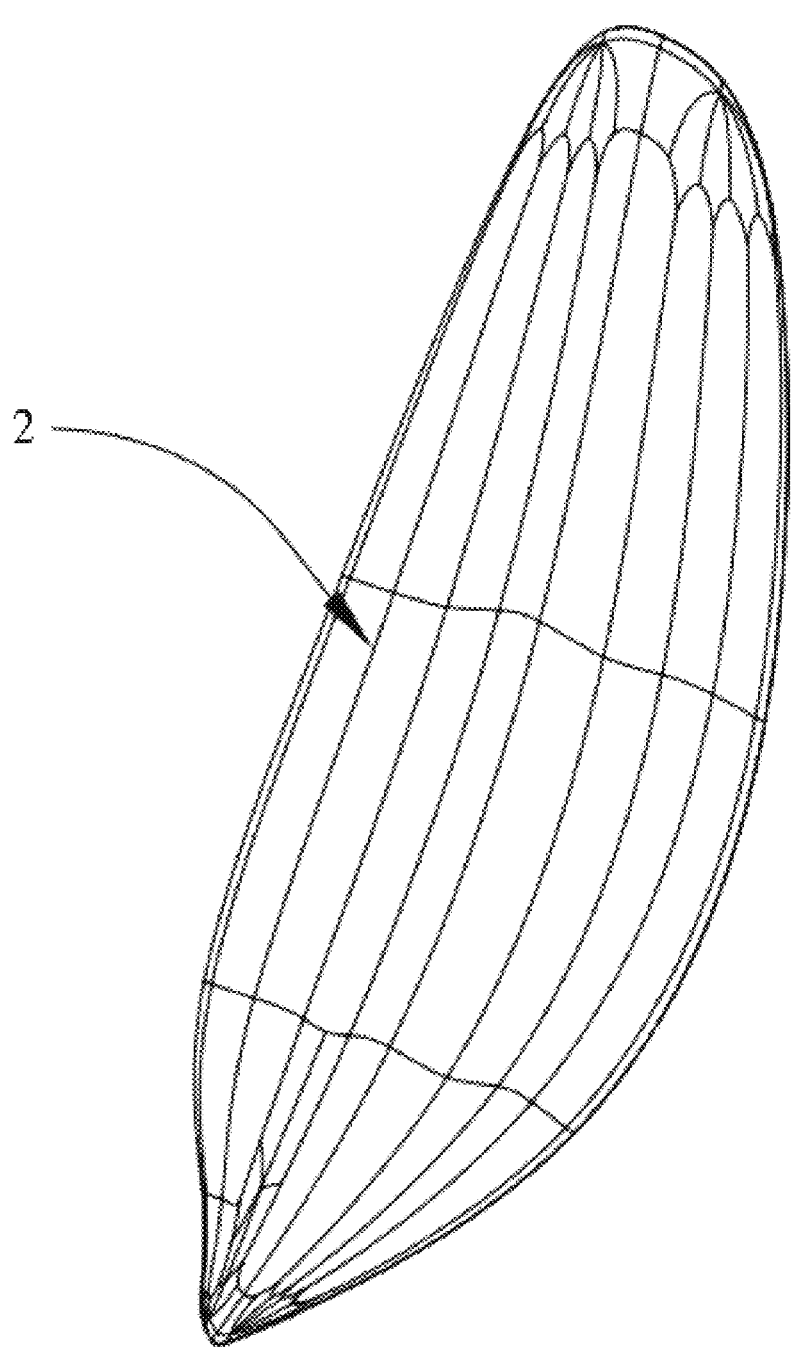
FIG. 18 is a structural schematic diagram of another type of structural unit.
Figure 19:
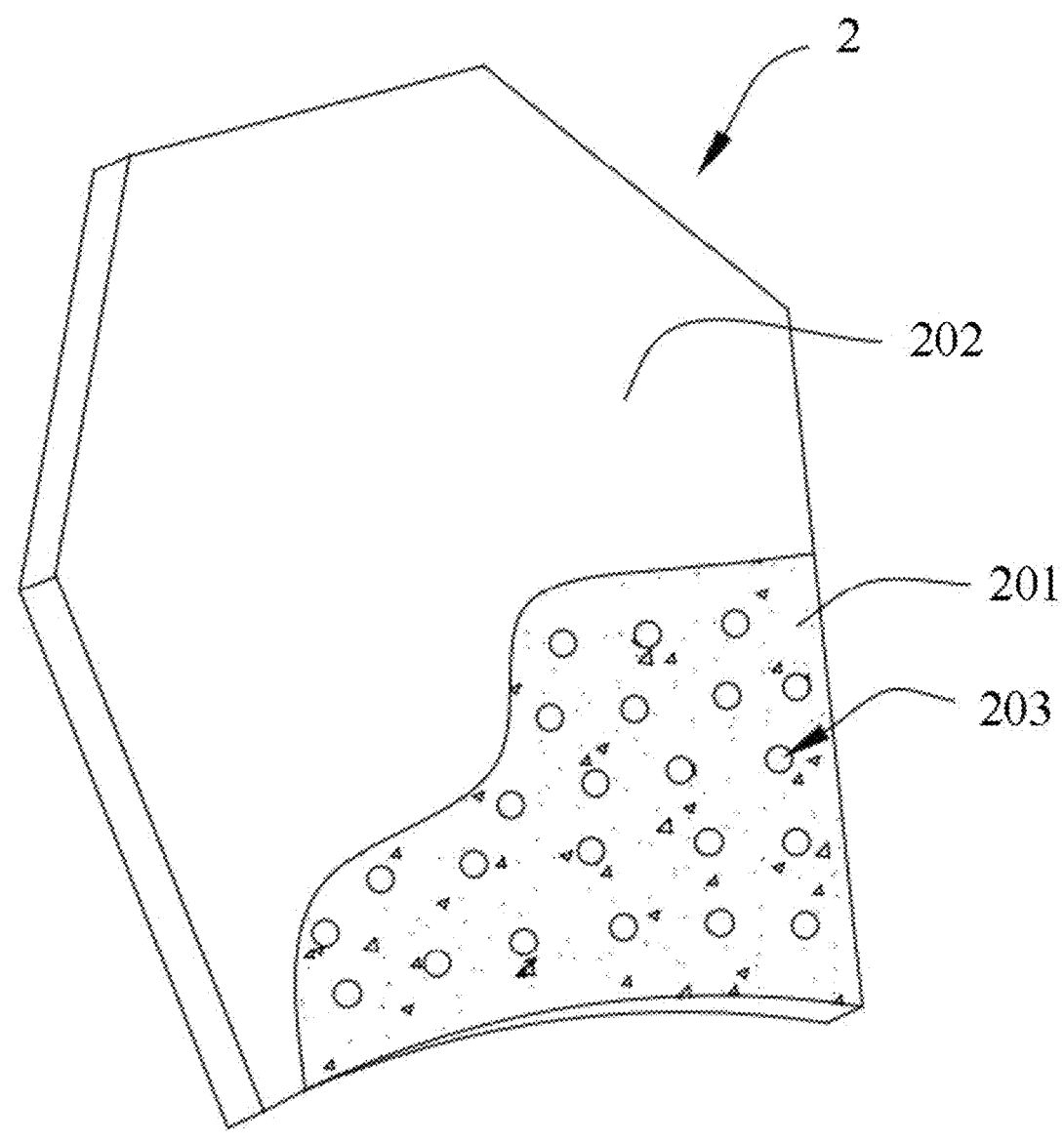
FIG. 19 is a structural schematic diagram of yet another type of structural unit, where the outer cover of the structural unit is partially cut.

It should be understood that structurally, the structural unit 2 can choose the external shape structure shown in FIGS. 18 and 19. It should be noted that in FIG. 19, several holes 203 are distributed on the core board 201.

As a further description of the structural unit 2, the upper part of the said structural unit 2 converges inwardly to form the closed top. This design not only considers aesthetics, but also takes into account functionality. The upper part of the structural unit 2 converges inwardly to form a natural arc or tip, making the entire collar look more like a blooming flower, which is more visually appealing, while also increasing the stability and strength of the structure.

The adjacent structural units 2 cooperate, like petals of a flower, to form ventilation gaps 7. The presence of ventilation gaps 7 allows air to freely circulate between the front and back of the collar, thereby effectively dissipating heat and avoiding the stuffy feeling caused by prolonged wearing. This design is particularly suitable for pets that wear collars for long periods of time, ensuring that they remain comfortable in all circumstances.

In addition, the ventilation gaps 7 are not only for heat dissipation, but also to reduce obstruction of the pet's vision. Based on the above structure, pets can still have a relatively wide field of vision when wearing the collar. For pets that like to observe their surroundings, this design can reduce the interference of wearing a collar on their daily life and activities, improving their adaptability and comfort.

In the barrier structure 6 of this embodiment, the adjacent areas of the lower parts of the various structural units 2 overlap up and down to form hollow drainage positions 3. These drainage positions are ingeniously designed to effectively direct the flow of fluids. The presence of drainage positions 3 allows the pet's saliva or other fluids to be quickly drained outside the collar, thereby preventing fluid accumulation inside the collar and preventing odor and bacterial growth.

Specifically, when a dog's saliva flows to the structural unit 2, the fluid will flow down along the outer surface of the structural unit 2 and enter the hollow drainage position 3. Since the drainage position 3 is formed with an up-and-down overlapping structure, the fluid will quickly drain out of the collar through these drainage positions 3 under the action of gravity without remaining inside the collar. This effectively prevents bacterial growth and maintains the hygiene and dryness of the collar.

Furthermore, the design of the structural unit 2 allows it to deform flexibly when it encounters external pressure, thereby avoiding interference with the pet's walking. Each structural unit 2 can independently cope with external collisions and pressure. When an individual structural unit 2 collides with an object, the structural unit 2 deforms naturally, reducing resistance to the pet and allowing the pet to move freely. Compared to conventional one-piece pet collars, the structural units 2 in this design can independently and flexibly respond to external pressure, greatly reducing the pulling sensation on the pet when the collar interferes with walls, furniture, etc. during movement.

Figure 8:
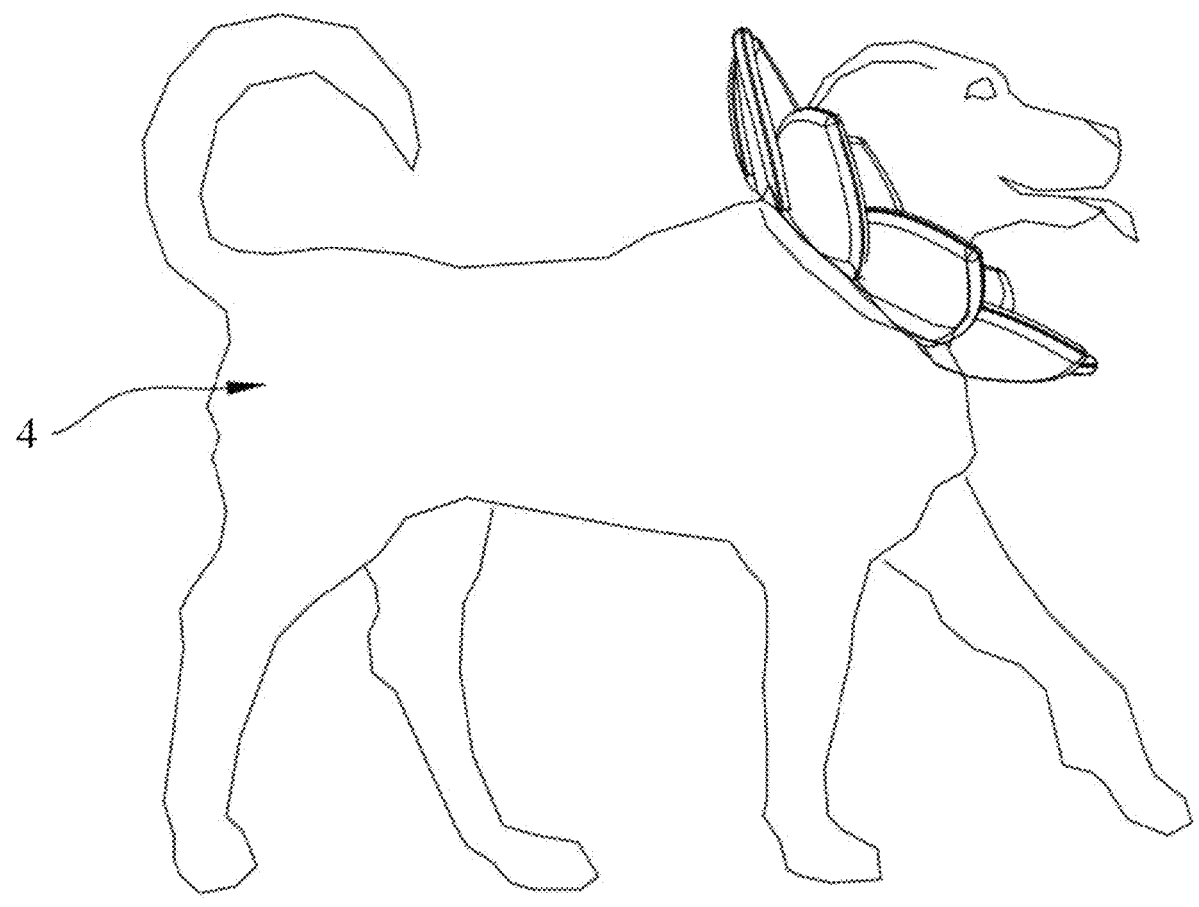
FIG. 8 is a structural schematic diagram of a pet dog wearing the collar of Embodiment 1 when the collar interferes with a wall while walking.
Figure 9:
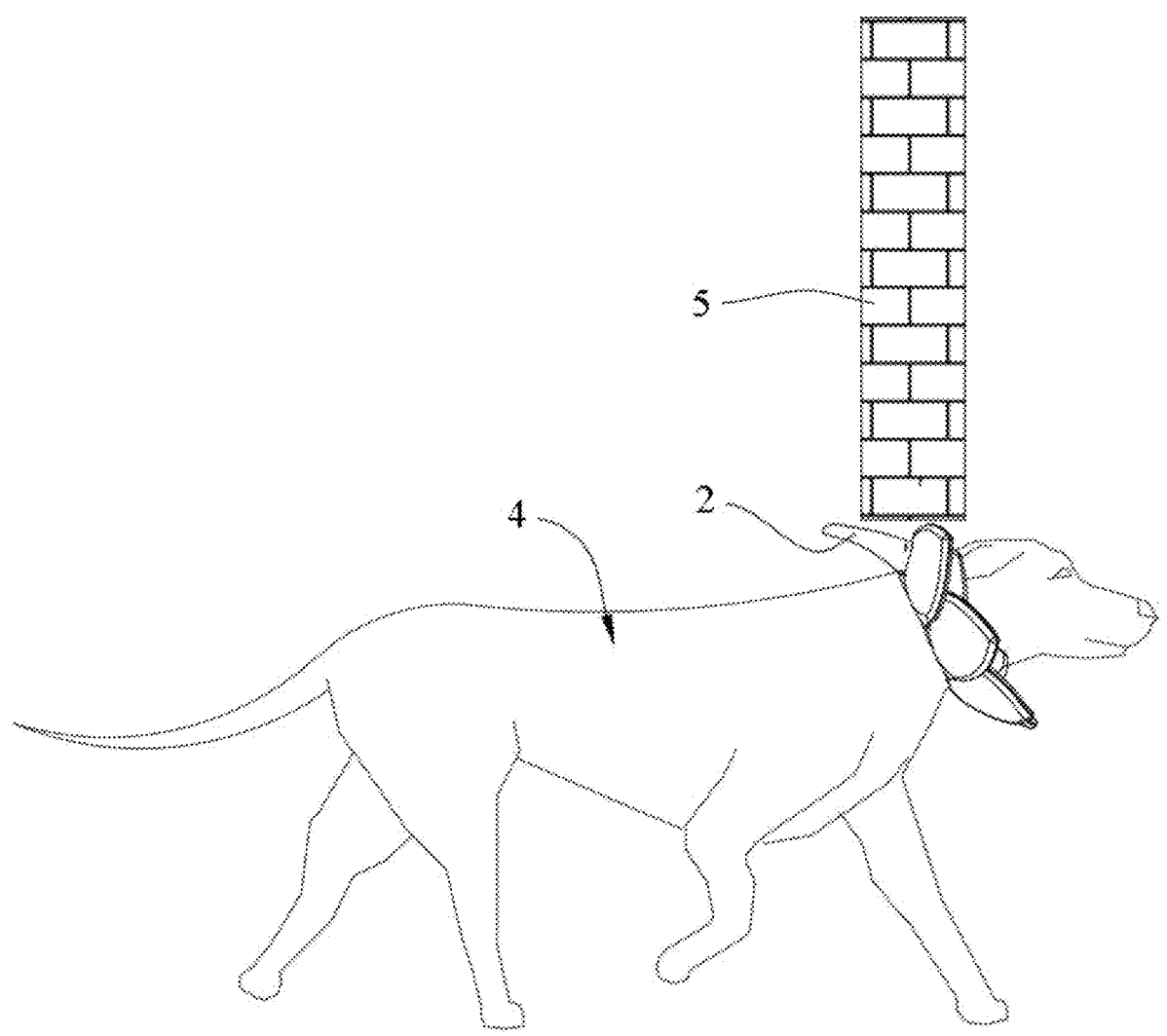
FIG. 9 is a structural schematic diagram of the deformation of structural units after the collar of Embodiment 1 worn by a pet dog interferes with a wall while walking.
Figure 10:
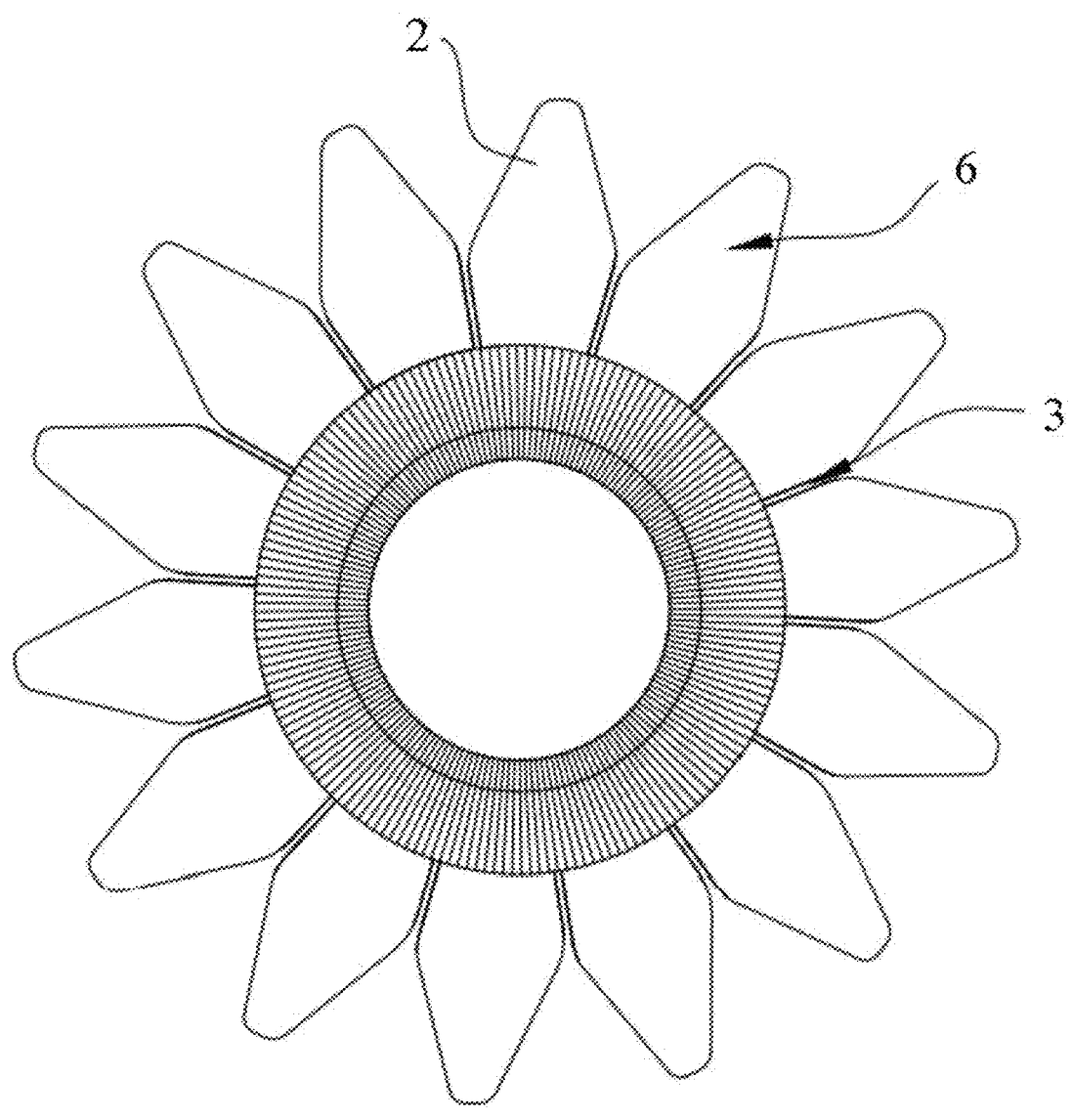
FIG. 10 is a structural schematic diagram of Embodiment 2.
Figure 11:
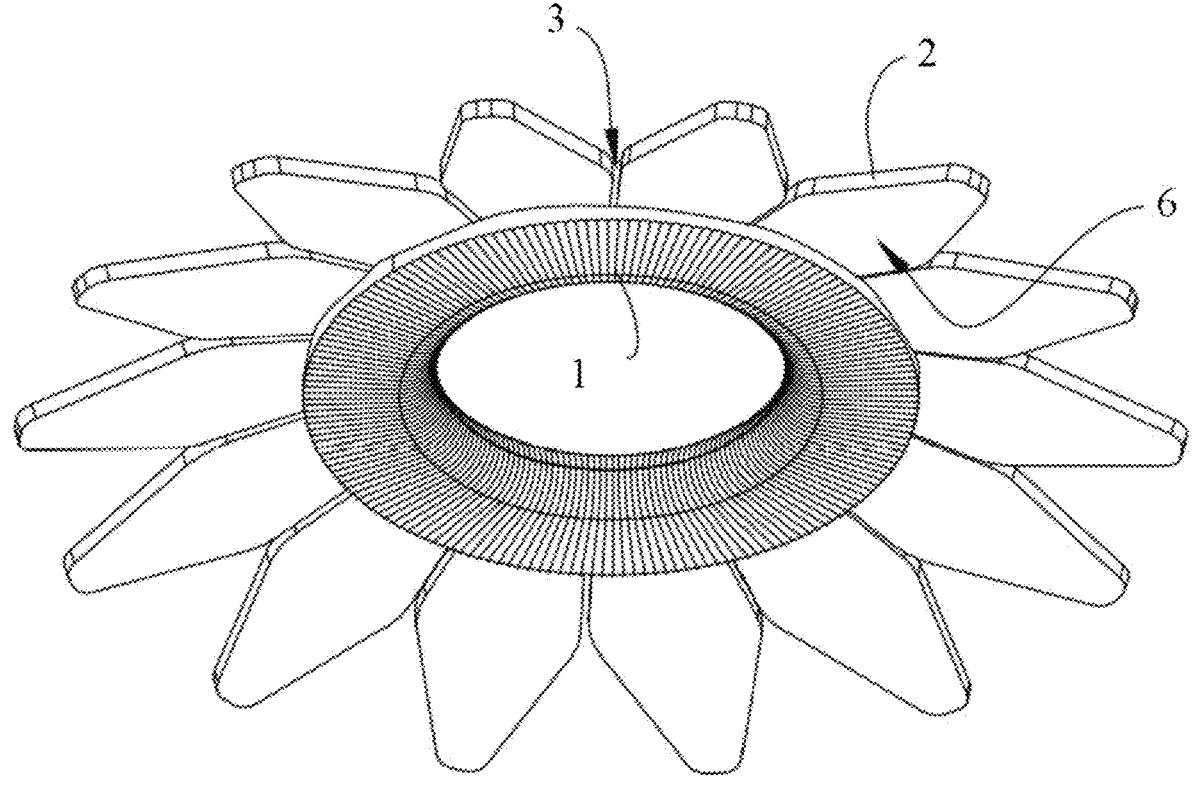
FIG. 11 is a structural schematic diagram of Embodiment 2 from another perspective.
Figure 12:
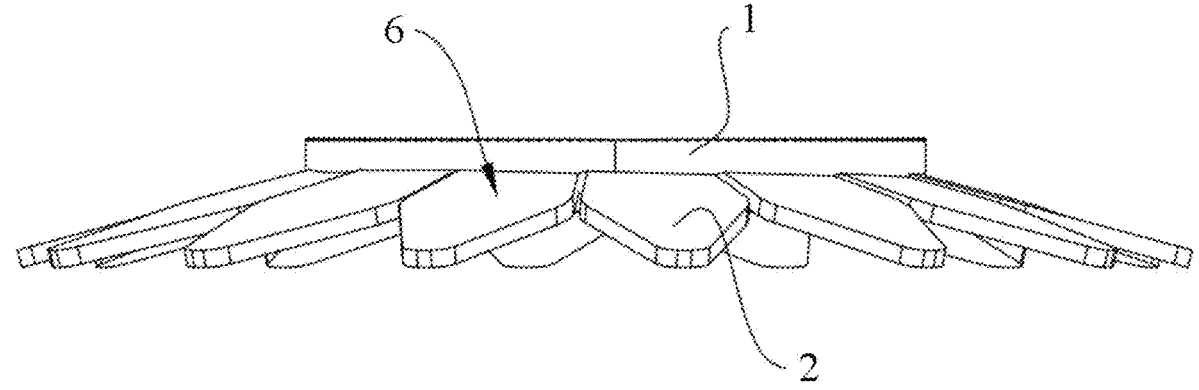
FIG. 12 is a structural schematic diagram of Embodiment 2 from yet another perspective.
Figure 13:
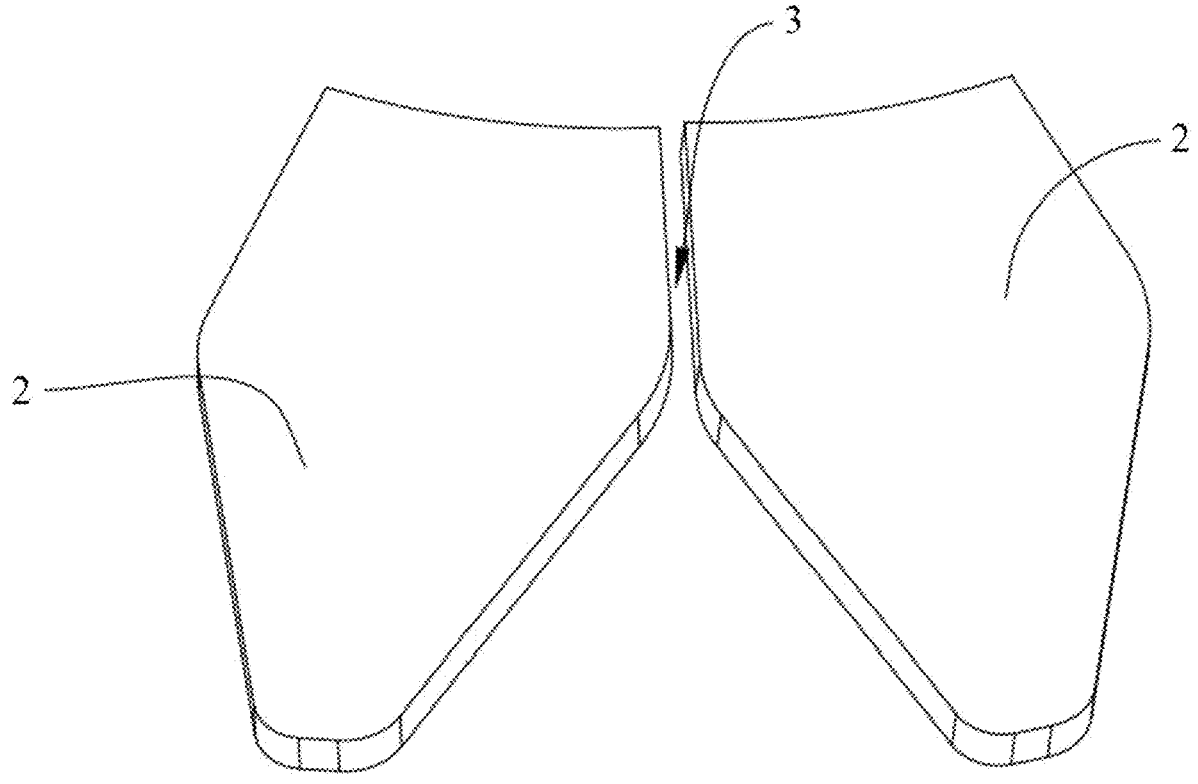
FIG. 13 is a structural schematic diagram of the fitting of two adjacent structural units in Embodiment 2.
Figure 14:
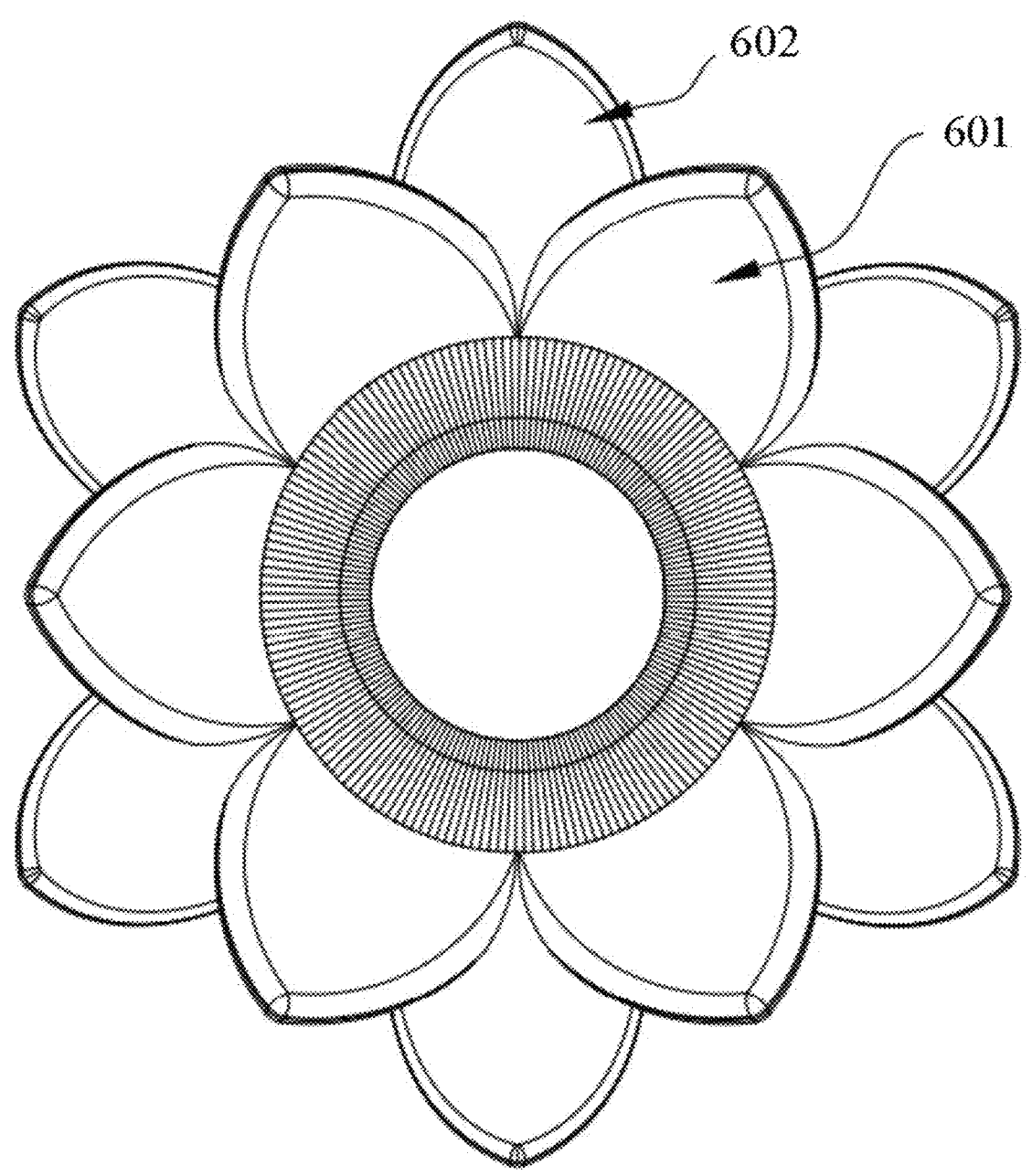
FIG. 14 is a structural schematic diagram of Embodiment 3.
Figure 15:
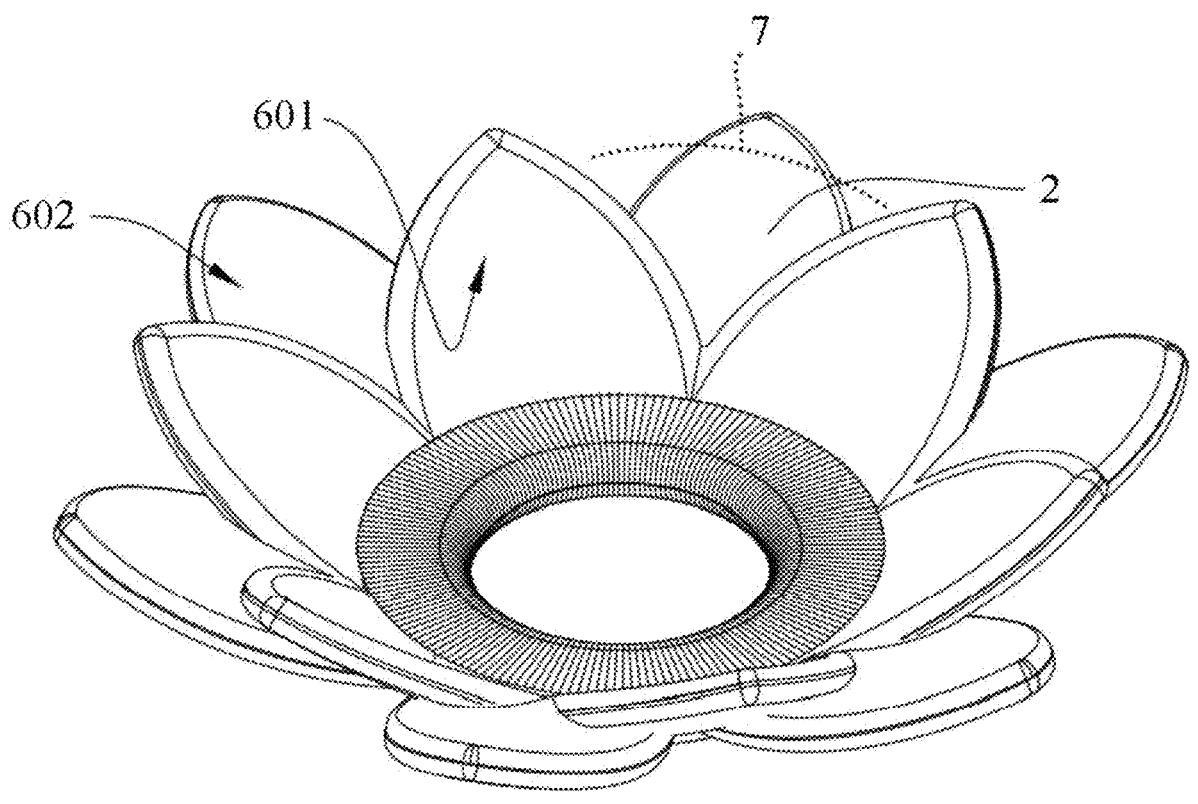
FIG. 15 is a structural schematic diagram of Embodiment 3 from another perspective.
Figure 16:
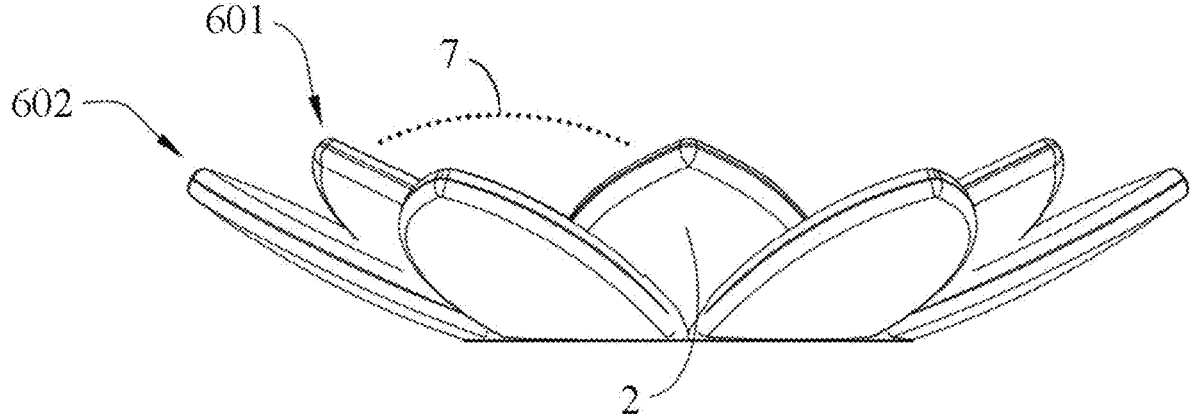
FIG. 16 is a structural schematic diagram of Embodiment 3 from yet another perspective.
Figure 17:
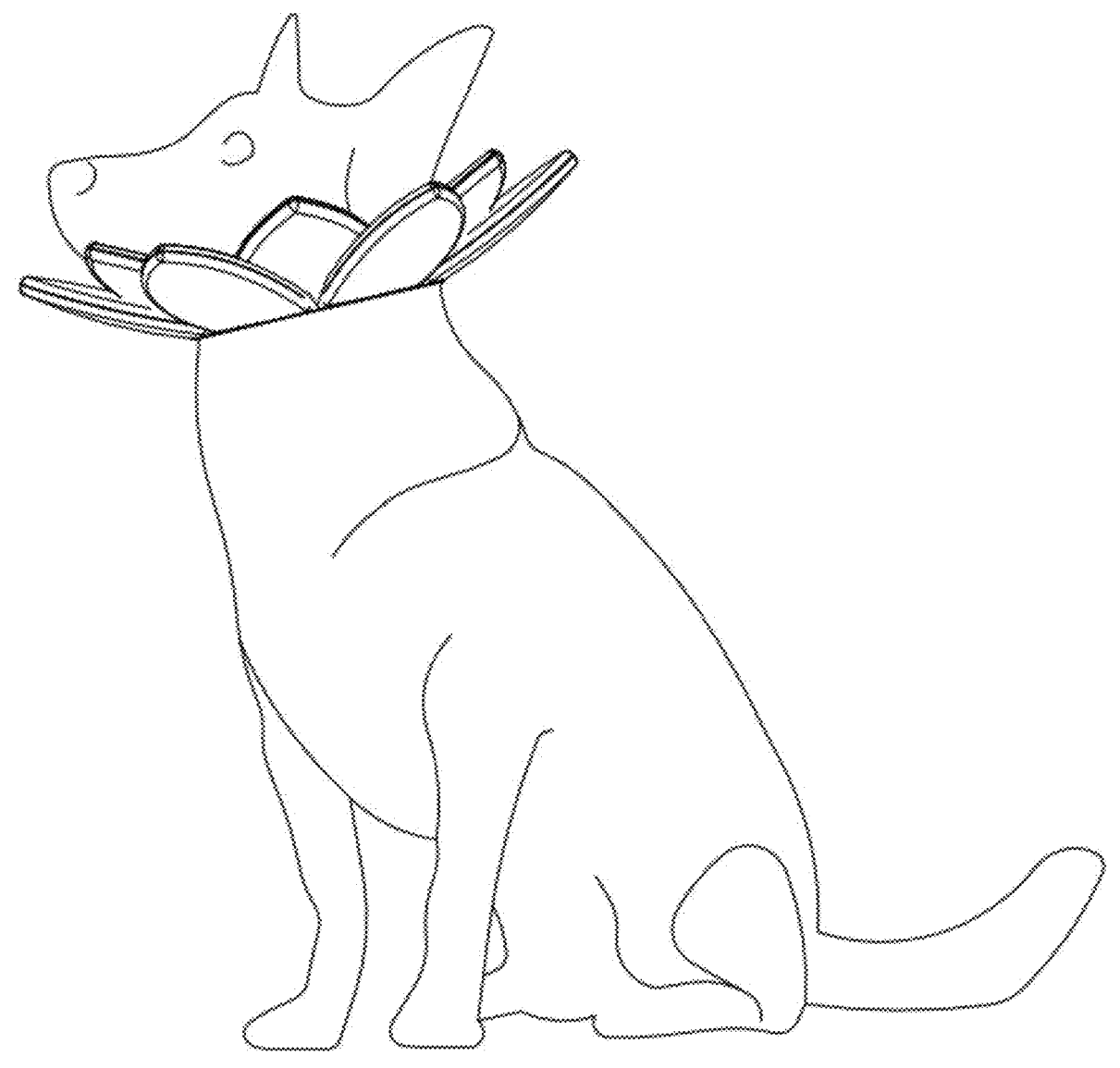
FIG. 17 is a schematic diagram of the state of use of a pet dog wearing the collar of Embodiment 3.

As a further description, specifically in FIG. 8, it can be seen that after a pet dog 4 wears the collar of this embodiment and interferes with a wall 5. The wall 5 touches the part of the structural unit 2 on the collar that is near the outer edge. As the pet dog 4 moves forward, as shown in FIG. 9, the structural unit 2 deforms and resolves the interference.

Compared to conventional pet collars, this embodiment has obvious technical advantages in material selection and structural design. The flexible fabric and drawstring adjustment mechanism ensure the adaptability and comfort of the collar, allowing it to be adjusted according to different pet neck sizes and adapted to different use scenarios. The combination of foam plastic core board 201 and breathable fabric not only reduces the weight of the collar, but also provides good breathability and waterproofing, ensuring comfort and safety. The drainage position 3 design provides excellent protective function, maintaining cleanliness inside the collar and effectively preventing bacterial growth and odor production. The flexible deformation ability of the structural units ensures that pets are not disturbed when walking and moving, improving the overall user experience.

The design of this embodiment is particularly suitable for dogs that tend to drool, which provides great convenience and comfort. Compared to the conventional pet collars, this design significantly improves functionality and comfort, bringing a better user experience for pets and pet owners.

Embodiment 2

As shown in FIGS. 10-13, this embodiment demonstrates the structure of a pet collar with individual barrier gaps. In this embodiment, the inner ring 1 is similar to that of Embodiment 1. Unlike Embodiment 1, the barrier 6 is composed of multiple distributed structural units 2, and the structural unit 2 consists of a core board 201 and an outer cover 202 covering the core board 201. Unlike Embodiment 1, the core board 201 is made of a hollow plastic board having good strength and lightness, which effectively disperses pressure and reduces the burden on the pet's neck. The hollow plastic board has good structural strength while maintaining a relatively light weight, which is suitable for long-term wearing.

In this embodiment, the lower adjacent areas of the various structural units 2 are spaced apart to form hollow drainage positions 3. The design of the drainage positions 3 allows the pet's saliva or other fluids to be quickly drained out of the collar through these spaces, thereby preventing fluid accumulation within the collar and preventing odor and bacterial growth. When a dog wears this collar, saliva flows along the structural units to the bottom of the collar and quickly drains through the hollow drainage positions 3. This design ensures that fluid does not accumulate inside the collar, keeping the inside of the collar dry and hygienic.

Similar to Embodiment 1, the design of the structural units 2 in this embodiment allows them to flexibly deform when encountering external pressure, thereby avoiding interference with the pet's walking. Each structural unit is independent of other structural units and naturally deforms when it collides with the objects, reducing resistance to the pet and ensuring the pet's free movement. The conventional pet collars tend to be one-piece, limiting the pet's activity, while this design, with its spaced structural units 2, significantly improves flexibility and comfort.

Embodiment 3

As shown in FIGS. 13-17, this embodiment discloses an exemplary structure of a double-layer barrier pet collar. In this embodiment, unlike Embodiment 1, the barrier 6 has two layers 601 and 602 configured on the inner ring 1 in a front and rear order. The entire rear barrier 602 is rotated by half a structural unit 2 position, so that the structural units 2 of the rear barrier 602 are misaligned with the front barrier 601 after the rotation, thereby allowing the rear barrier 602 to cover the ventilation gaps 7 of the front barrier 601, thereby increasing the stability and protective effect. The outer diameter of the rear barrier 602 is larger than that of the front barrier 601, and the structural units 2 in the rear barrier 602 are connected to the corresponding two structural units 2 in the front barrier 601 through connection points, thereby ensuring the overall structural stability.

Although exemplary embodiments of this disclosure have been described, it should be understood by those skilled in the art that various changes and modifications may be made to the exemplary embodiments of this disclosure without substantially departing from the spirit and scope of this disclosure. Therefore, all changes and modifications are included within the scope of protection of this disclosure as defined by the appended claims. This disclosure is limited by the appended claims, and the equivalents of those claims are also included.

What is claimed is:

1. A pet neck collar, including an inner ring and a barrier configured on the inner ring, wherein the barrier is composed of multiple structural units distributed on the inner circumference; at least in a lower portion of each structural unit, adjacent structural units cooperate to form a drainage position, and at least in an upper portion of each structural unit, the adjacent structural units cooperate to form a ventilation gap;

wherein the inner ring is configured to be a circular shape or a closed structure.

2. The pet neck collar according to claim 1, wherein the upper part of the structural unit converges inwardly to form a closed top.

3. The pet neck collar according to claim 1, wherein each structural unit has an elliptical shape, with a wider bottom and gradually converging upward to form a tip.

4. The pet neck collar according to claim 1, wherein the structural unit is composed of a core board and an outer cover encasing the core board.

5. The pet neck collar according to claim 4, wherein the core board is made of a foam plastic board, a hollow plastic board, or a sponge.

6. The pet neck collar according to claim 4, wherein the core board is provided with several ventilation holes.

7. The pet neck collar according to claim 4, wherein the outer cover is made of a breathable fabric, a waterproof fabric, or an absorbent fabric.

8. The pet neck collar according to claim 4, wherein the outer cover has a water-repellent layer.

9. The pet neck collar according to claim 1, wherein at least lower portions of adjacent structural units are spaced apart to form hollow drainage positions.

10. The pet neck collar according to claim 1, wherein at least lower portions of adjacent structural units are closely fitted to form solid drainage positions.

11. The pet neck collar according to claim 1, wherein all structural units are tilted in the same direction such that at least lower portions of adjacent structural units partially overlap above and below, using a gap formed by overlapping lower portions of adjacent structural units to form solid or hollow drainage positions.

12. The pet neck collar according to claim 1, wherein the inner ring has at least two layers of barriers configured in a front and rear order, the two barriers being rotated and misaligned such that the rear barrier partially covers the ventilation gaps of the adjacent front barrier.

13. The pet neck collar according to claim 12, wherein an outer diameter of the rear barrier is larger than that of the adjacent front barrier.

14. The pet neck collar according to claim 12, wherein the structural units in the rear barrier are positioned between two corresponding structural units in the adjacent front barrier.

15. The pet neck collar according to claim 12, wherein the structural units in the rear barrier have at least one connection with each of the two corresponding structural units in the adjacent front barrier.

16. The pet neck collar according to claim 12, wherein the rear barrier is spaced apart from the adjacent front barrier.

17. The pet neck collar according to claim 1, wherein the inner ring is a deformable flexible body and the diameter of the inner ring is adjusted by a drawstring, the inner ring has a string guide channel and a string exit hole, the drawstring passes through the string guide channel and exits from the string exit hole, forming an adjustable closed loop.

18. The pet neck collar according to claim 1, wherein the inner ring is a deformable flexible body and at least one region of the inner ring is disconnected and overlapped, the inner ring diameter being adjusted by adjusting the overlap size of the disconnected region.

19. The pet neck collar according to claim 1, wherein the inner ring is an elastic inner ring, the inner ring elastically deforms to adjust the inner ring diameter to adapt to different pet wearing needs.

20. The pet neck collar according to claim 1, wherein the structural units of the barrier are detachably connected to the inner ring.

* * * * *